United States Patent [19]

Masseling et al.

[11] Patent Number: 5,194,239
[45] Date of Patent: Mar. 16, 1993

[54] OXYGEN-BASED NONCATALYTIC SULFURIC ACID PROCESS

[75] Inventors: Jacobus J. H. Masseling, Arcadia; David Netzer, Pasadena, both of Calif.

[73] Assignee: The Ralph M. Parsons Company, Pasadena, Calif.

[21] Appl. No.: 793,100

[22] Filed: Nov. 15, 1991

Related U.S. Application Data

[63] Continuation-in-part of Ser. No. 785,271, Oct. 30, 1991, abandoned, which is a continuation-in-part of Ser. No. 661,847, Feb. 26, 1991, abandoned.

[51] Int. Cl.$^5$ .................... C01B 17/69; C01B 17/74
[52] U.S. Cl. ................................. 423/522; 423/529; 423/532; 423/543
[58] Field of Search ............... 423/522, 524, 526, 527, 423/529, 531, 532, 533, 543

[56] References Cited

U.S. PATENT DOCUMENTS

| | | | |
|---|---|---|---|
| 1,520,093 | 12/1924 | Shapleish | 423/522 |
| 3,432,263 | 3/1969 | Ohsol | 423/524 |
| 3,907,979 | 9/1975 | Jewning | 423/522 |
| 4,046,866 | 9/1977 | Hurlburt | 423/522 |

FOREIGN PATENT DOCUMENTS

| | | | |
|---|---|---|---|
| 534938 | 12/1976 | Canada | 423/529 |
| 2737 | 7/1979 | European Pat. Off. | 423/532 |
| 101965 | 3/1984 | European Pat. Off. | 423/532 |
| 3315263 | 10/1984 | Fed. Rep. of Germany | 423/529 |
| 467298 | 7/1937 | United Kingdom | 423/529 |

OTHER PUBLICATIONS

Donovan et al Sulfonic Acid Convertor Optimization Chemical Engineering Progress Sep. 78 pp. 51–54.
Duecker et al (ed) The Manufacture of Sulfuric Acid American Chemical Society Monograph 144, 1959. Robert Krieser Publishing Co. Huntington NY 1977 pp. 135–137.

Primary Examiner—Gary P. Straub
Attorney, Agent, or Firm—Christie, Parker & Hale

[57] ABSTRACT

A noncatalytic process for producing sulfur trioxide and sulfuric acid in which sulfur is combusted with an oxygen-rich gas in the presence of recycled sulfur dioxide-rich gas to form sulfur trioxide which is absorbed in sulfuric acid and yield a sulfur dioxide rich gas which is compressed to form the recycled sulfur dioxide rich gas.

31 Claims, 2 Drawing Sheets

OXYGEN-BASED NONCATALYTIC SULFURIC ACID PROCESS

CROSS REFERENCE TO RELATED APPLICATION

This is a continuation-in-part of application Ser. No. 07/785,271 filed Oct. 30, 1991, now abandoned, which is a continuation-in-part of application Ser. No. 07/661,847 filed Feb. 26, 1991, now abandoned.

FIELD OF THE INVENTION

The present invention is directed to improvements in the manufacture of sulfuric acid from elemental sulfur and oxygen.

BACKGROUND OF THE INVENTION

Sulfuric acid and sulfur trioxide may be formed by reacting a sulfur dioxide ($SO_2$) containing gas with excess air over a suitable oxidation catalyst to form sulfur trioxide ($SO_3$) by the reversible reaction:

$$SO_2 + \tfrac{1}{2}O_2 \rightarrow SO_3 + Heat$$

The sulfur dioxide can be supplied as such or formed by the combustion of sulfur with air or oxygen-enriched air. The formed sulfur trioxide is absorbed in water or in sulfuric acid.

In the evolution of processes for sulfuric acid manufacture, it became popular to use multiple contact and multiple absorption processes as disclosed, for instance, in U.S. Pat. Nos. 3,259,459 to Moeller, 3,362,786 to Burkhart, 3,525,587 to Browder, and 3,620,673 also to Browder, the disclosure in each is specifically incorporated herein by reference. The processes have varied dependant upon whether the supply or feed is sulfur or sulfur dioxide, and also in the route of passage of a sulfur dioxide/sulfur trioxide containing gas through a plurality of heat exchanges in route to or between a plurality of catalytic conversion stages. All rely on sulfur trioxide removal in a first stage of absorption following a first series of catalytic conversion stages, then passage of the residual gas stream through at least one final catalytic conversion stage to maximize conversion of sulfur dioxide to sulfur trioxide, followed by passing the resultant sulfur trioxide-containing gas stream through a final sulfur trioxide absorption stage before venting the remaining gas stream to the atmosphere. The gas passing to each catalytic stage is normally heated to its kindling temperature by heat exchange between the gases passing between catalytic conversion stages. In the case where sulfur dioxide is formed by combustion of sulfur, the heat of combustion may be used to heat the gas stream passing to the catalytic stage following an intermediate absorption stage to its kindling temperature. This process has been known over the past twenty years as a double contact/double absorption or DC/DA system.

U.S. Pat. No. 3,630,673 describes a basic flow scheme and operating parameters for a DC/DA plant based on a sulfur-burning process.

In a typical DC/DA sulfur-burning sulfuric acid plant, molten sulfur is burned with air to produce a gas stream containing about 9-12% by volume sulfur dioxide. The hot combustion products are usually passed through a waste heat boiler to reduce the sulfur burner exit temperature to the required feed temperature for a first catalytic conversion stage while producing high-pressure steam.

The first catalytic conversion stage consists of a plurality of catalytic beds in series, where the majority of the sulfur dioxide is converted to sulfur trioxide. Heat liberated by the reaction is removed between each bed of the first catalytic conversion stage and used to heat the gas passing from an intermediate absorption stage to a second catalytic conversion stage. The heat exchange ensures that a gas stream passing to any catalyst bed is at its kindling temperature and prevents overheating of the catalyst.

Following final conversion and cooling, the gas stream is sent to the second absorption stage which functions in a manner similar to the first absorption stage. After absorption of sulfur trioxide, the gas is passed through a final demister, then through a stack to the atmosphere.

Customarily, a three-stage converter with one final converter will produce an exit gas containing up to about 400 ppm by volume (ppmv) sulfur dioxide, sulfuric acid mist up to about 0.1 Kg per ton of produced sulfuric acid and up to about 400 ppmv oxides of nitrogen.

In countries with severe restrictions on sulfur dioxide emissions to the atmosphere, such as Japan, it is customary to use a two-stage converter with one final converter to produce an exit gas with up to about 1000 ppmv sulfur dioxide followed by use of an additional tail gas cleanup process to reduce the residual sulfur dioxide content in the exit gas to below 50 ppmv.

For a sulfur-burning sulfuric acid plant, heat enters the system from five sources and is removed by three main systems. Heat enters as heat of compression of the main air blower, heat of combustion of sulfur to sulfur dioxide, heat of reaction (oxidation) of sulfur dioxide to sulfur trioxide, heat of reaction of water with sulfur trioxide to form sulfuric acid, and heat of dilution of the formed acid with water. Steam is generated in waste heat boilers and lower level process heat is usually recovered by preheating boiler feed water in economizers or lost to the environment. The value of energy exported from a sulfuric acid plant is a significant factor in sulfuric acid plant economics.

While current sulfuric acid plants can achieve overall sulfur conversion efficiencies of up to 99.7%, there is continuing pressure to provide sulfuric acid plants with even higher efficiencies. The proposed routes, however, have been completely dependent on the use of catalytic converters and more complete removal of sulfur dioxide from the process gas by altering the equilibrium conversion, either by removing sulfur trioxide or by either increasing the oxygen partial pressure by either increasing the system operating pressure or using oxygen-enriched air or a combination of both. The practical and economic difficulties of building and operating air-based sulfuric acid plants operated at higher pressure are such that only a limited number of plants of this type have been built. No technology is available to reduce the nitrogen oxide formation and subsequent emission to the atmosphere.

European Patent Application 0 002 737 pertains to a non-catalytic process in which sulfur, sulfuric acid and/or ammonium sulfate and a recycle stream containing sulfur dioxide, sulfur trioxide and oxygen are combusted with oxygen at high temperatures and high pressures to form a product gas containing sulfur dioxide, sulfur trioxide and oxygen. Sulfur trioxide is condensed then distilled to eliminate remaining $SO_2$. The inventors state that the process must be operated at a pressure between 500 and 5000 psig. At pressures below 500 psig the desired reaction will not be obtained because of the relatively low sulfur dioxide-oxygen molar ratio and relatively high concentration of sulfur trioxide in the feeds to the sulfur burner and at pressures more than 5000 psig formation of oxides of nitrogen would be enhanced. Moreover compressing oxygen rich gas stream above 500 psig is mechanically inefficient, expensive and a potentially hazardous operation.

It would be desirable to provide a process for sulfuric acid manufacture which is lower in equipment cost, at least competitive in processing cost, operates at relatively moderate pressures and which minimizes pollutants, such as sulfur dioxide, sulfuric acid mist, and nitrogen oxides to the environment. This is the purpose of the instant invention.

SUMMARY OF THE INVENTION

According to the present invention, there is provided a noncatalytic process for the manufacture of sulfur trioxide and/or sulfuric acid from elemental sulfur and oxygen.

Sulfur, normally in liquid form, is combined with an oxygen-rich gas make-up stream containing at least 75% by volume oxygen the remainder being essentially inert gases such as nitrogen, argon and the like and a recycle sulfur dioxide rich gas stream containing at least 50% by volume sulfur dioxide, the remainder being essentially inert gases such as nitrogen, argon and the like with a relatively small amount of oxygen and essentially no sulfur trioxide, in a combustion zone (sulfur burner) operating at a temperature of from about 700° C. to about 1000° C. and at an elevated pressure of up to about 35 $Kg/cm^2g$ (kilograms per square centimeter gauge) preferably up to about 15 $Kg/cm^2g$. The instantaneous $SO_2:O_2$ molar ratio of the combined oxygen-rich gas stream and recycle sulfur dioxide rich gas stream provided to the combustion zone is at least about 3:1. There is formed a gas stream containing from about 5% to about 15% by volume sulfur trioxide and from about 50% to about 98% by volume sulfur dioxide, the balance of the gas stream being substantially inerts, such as argon and nitrogen, a small amount of unreacted oxygen and carbon dioxide produced by combustion of organic material contained in the sulfur feed stock. The gas stream is passed to a sulfur trioxide absorption zone to remove the formed sulfur trioxide to leave a sulfur dioxide rich gas stream. Preferably, this sulfur dioxide rich gas stream is combined with the oxygen rich gas make-up stream after this stream has been used for stripping sulfur dioxide from sulfuric acid product. The sulfur dioxide rich gas stream is compressed to at least the operating pressure of the sulfur combustion zone and then fed as the recycle sulfur dioxide rich gas stream to the sulfur combustion zone.

In the process, the preferred instantaneous molar ratio of sulfur dioxide to oxygen in the combined gas feeds to the sulfur combustion zone is from about 3:1 to about 10:1, preferably about 4:1 to 7:1, and it is preferred that the sulfur dioxide content of the sulfur dioxide rich gas stream be about 50% to about 98% by volume, more preferably from about 65% to about 90% by volume. The oxygen-rich gas make-up stream supplied to the sulfur combustion zone preferably contains at least 75% by volume oxygen, preferably at least 90% by volume oxygen more preferably at least 95% by volume oxygen and most preferably at least 99% by volume oxygen. Obviously the instantaneous molar ratio is only at the time of input of reactions and changes a soon as sulfur trioxide forming reaction begins. Operating pressure of the sulfur combustion zone is up to about 35 $Kg/cm^2g$, preferably about 15 $Kg/cm^2g$, more preferably from about 1.0 to about 8 $Kg/cm^2g$ and most preferably from about 1.5 to 5 $Kg/cm^2g$. The preferred combustion temperature of the sulfur combustion zone is from about 750° C. to about 950° C., more preferably from about 775° C. to about 925° C. and most preferred from about 800° C. to about 900° C. The effluent of the sulfur combustion zone is preferably absorbed in sulfuric acid, and the heat of absorption an reaction is recovered preferably by transfer to another fluid in a heat exchanger.

BRIEF DESCRIPTION OF THE DRAWING

FIG. is a simplified flow diagram generally illustrating the process of the instant invention.

DESCRIPTION OF THE PREFERRED EMBODIMENT

The present invention provides a noncatalytic method for the production of sulfur trioxide from elemental sulfur and oxygen by combusting sulfur in the presence of an oxygen-rich gas stream and a recycle sulfur dioxide rich gas stream in one or more combustion zones, preferably a single combustion zone. The sulfur trioxide formed is separated from the combustion zone effluent, preferably by absorption in concentrated sulfuric acid. Unconverted sulfur dioxide, is recycled to the sulfur combustion zone to enhance the sulfur trioxide formation. A purging is employed to eliminate inerts from the circulating gas stream. In consequence, the process of the invention is essentially nonpolluting.

Figure 1:
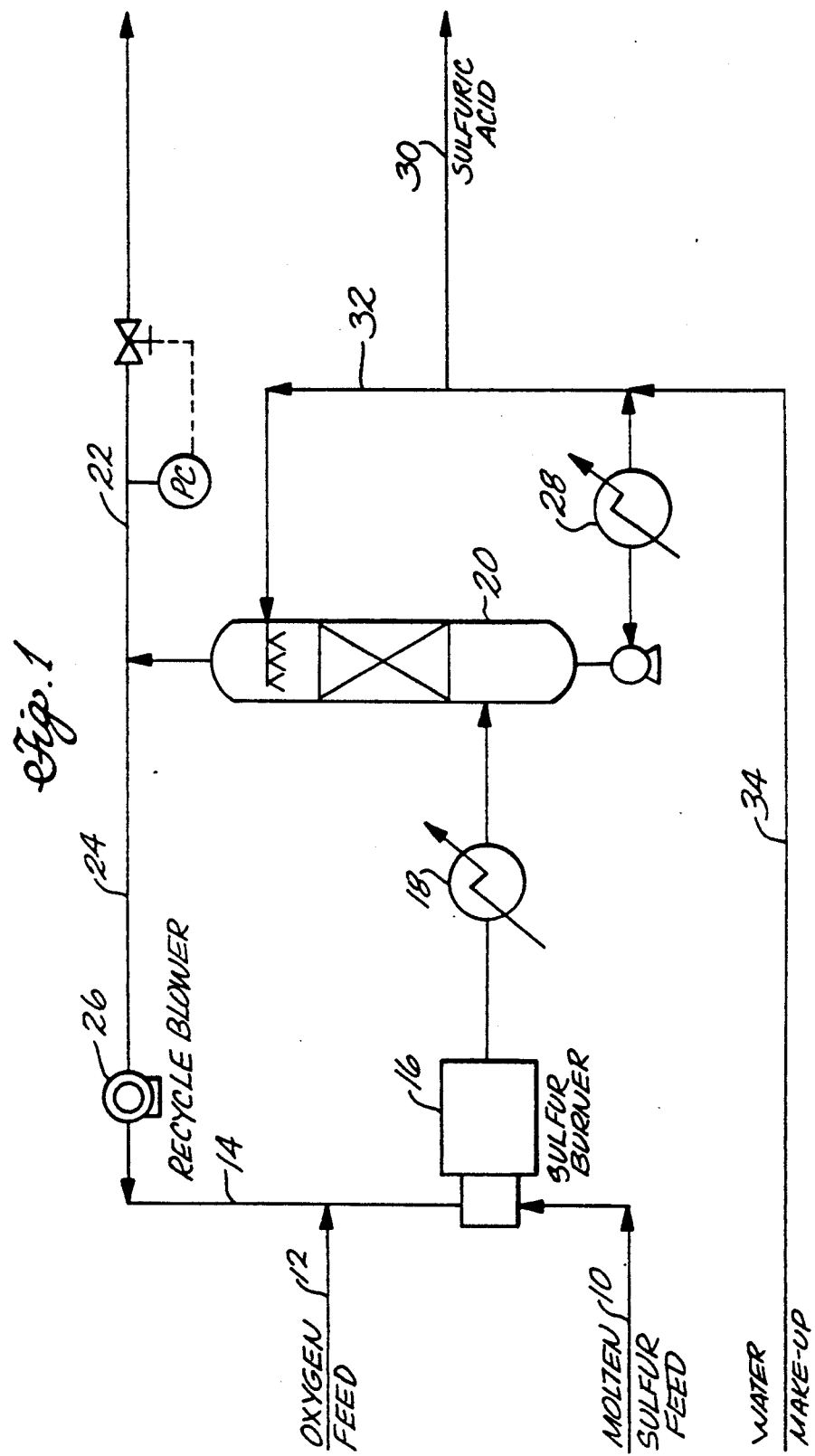

With reference to FIG. 1 liquid molten sulfur in line 10, an oxygen feed of desired oxygen strength in line 12, and a recycle sulfur dioxide rich gas stream in line 14 are combined in sulfur combustion zone 16 where sulfur is combusted to sulfur trioxide. Combustion takes place at a temperature less than about 1000° C., to yield an effluent gas stream containing sulfur dioxide, sulfur trioxide, the inerts introduced with the oxygen feed such as nitrogen and argon and a relatively small amount of nonreacted oxygen together with trace amounts of carbon dioxide produced by the combustion of organic impurities in the sulfur feed. Conditions in sulfur combustion zone 16 are preferably controlled to assure substantially complete utilization of oxygen.

The product gas stream at combustion temperature is passed through heat exchanger 18 where high pressure steam is generated for use in the process or elsewhere. The gas stream is then passed to sulfur trioxide absorption zone 20, where essentially all the formed sulfur trioxide is removed from the gas stream as sulfuric acid. The effluent gas stream from absorption zone 20 is essentially free of sulfur trioxide and consists mainly of sulfur dioxide, inerts, and small amounts of oxygen and carbon dioxide. To prevent the accumulation of inerts in the gas stream, a side stream 22 is drawn off or purged from the system. The residual gas stream, rich in sulfur dioxide, is passed by line 24 to recycle blower 26 where the gas stream is compressed to at least the pressure of sulfur burner 16 and fed as the recycle sulfur dioxide rich gas stream by line 14 to sulfur burner 16.

The sulfuric acid formed in absorber 20 is withdrawn from the base and passed to absorber cooler 28 for recovery of the heats of absorption/reaction. A portion of the sulfuric acid is withdrawn as sulfuric acid product in line 30 after water is added by line 34 to form a sulfuric acid stream of reduced strength for return by line 32 back to absorption zone 20.

Figure 2:
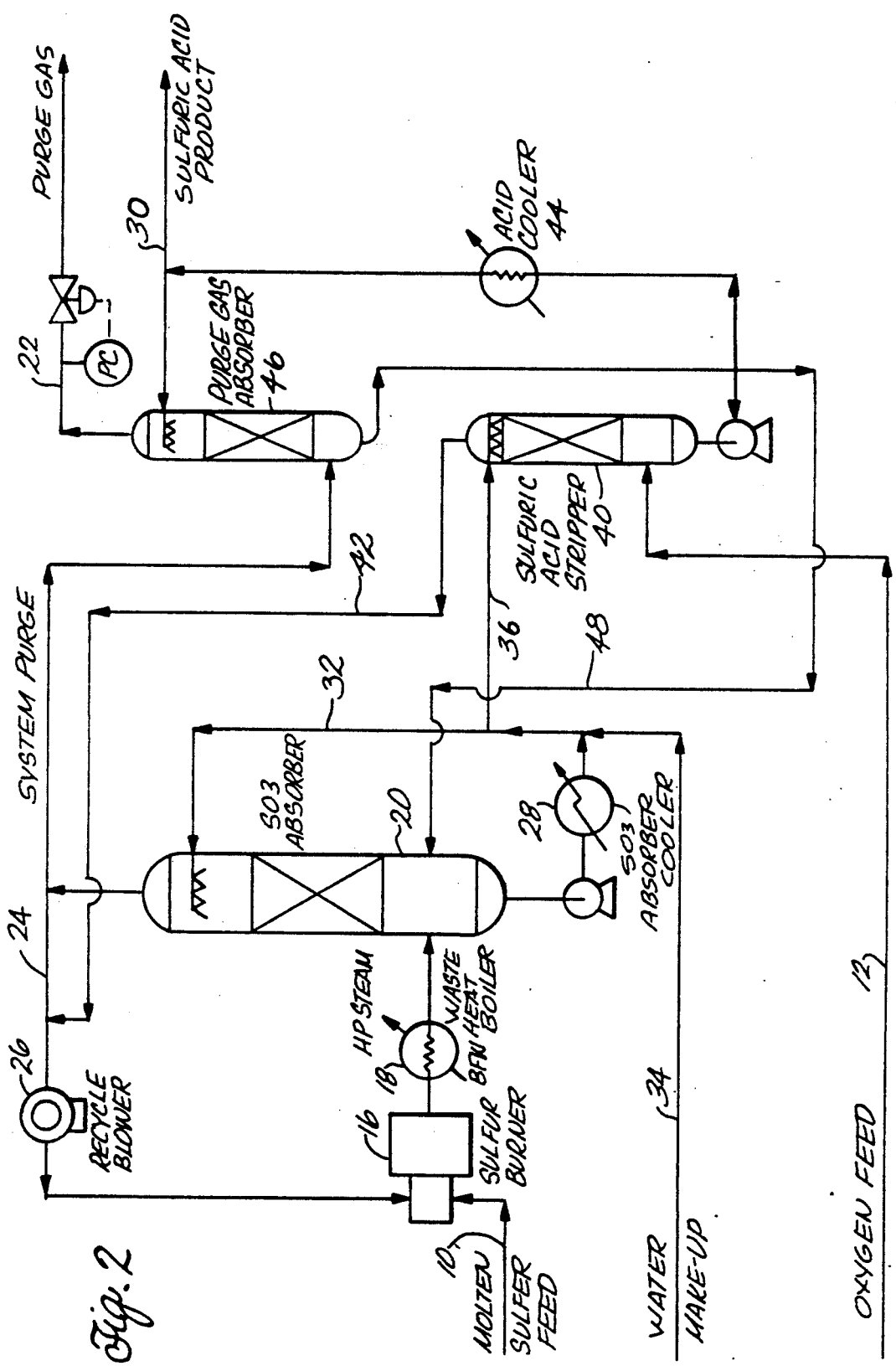
FIG. 2 is a simplified flow diagram showing additional features of the process.

The FIG. 2 schematic is a process flow diagram showing the major elements described in FIG. 1 together with the purge gas absorber 46 and sulfuric acid stripper 40. The sequence shown for production of sulfuric acid illustrated utilizes relatively high purity oxygen in line 12, liquid molten sulfur in line 10, and a recycle sulfur dioxide rich gas stream in line 24, all of which are fed to a sulfur combustion zone (sulfur burner) 16. Substantially all of the sulfur trioxide contained in the effluent gas stream from the sulfur burner is absorbed in absorber 20 to form hot concentrated sulfuric acid. The off-gas of the absorber is rich in sulfur dioxide and is recycled to the sulfur burner in which the operating conditions are such that all sulfur trioxide required for the process is produced in a single reaction stage. Among the advantages of this process are simplicity and elimination of catalytic converters, and, furthermore, the process is essentially nonpolluting since the amount of gas purged from the system is very small and consists essentially of inerts, such as argon, which may be recovered. Ideally, the oxygen supply is also from an air separation plant from which argon and nitrogen are recovered. Higher oxygen purity will minimize the amount of purge necessary to control the accumulation of inerts in the system.

The following is an example of the invention with reference to FIG. 2.

EXAMPLE

In sulfur burner 16, molten liquid sulfur is combined with a recycle sulfur dioxide rich gas stream received from recycle blower 26 along with high purity oxygen make-up fed through sulfuric acid stripper 40. In the sulfur burner 16, the oxygen is used to convert sulfur to sulfur trioxide, forming an effluent stream from the sulfur burner which typically contains about 5 to 15 percent by volume of sulfur trioxide.

The following operating conditions are maintained in sulfur burner 16.

| Temperature | |
|---|---|
| Range | 700–1000° C. |
| Preferred Range | 750–950° C. |
| More Preferred Range | 775–925° C. |
| Most Preferred Range | 800–900° C. |
| Nominal | 830° C. |
| Pressure | |
| Range | up to 35 Kg/cm$^2$g |
| Preferred Range | up to 15 Kg/cm$^2$g |
| More preferred Range | 1–8 Kg/cm$^2$g |
| Most Preferred Range | 1.5–5 Kg/cm$^2$g |
| Nominal | 3.75 Kg/cm$^2$g |
| Oxygen Make-up Composition Volume % | |
| Minimum, | at least 75% |
| Preferred O$_2$, | at least 90% |
| More preferred, | at least 95% |
| Most preferred, | at least 99% |
| Recycle SO$_2$ Rich Gas Stream, Volume % SO$_2$ (before O$_2$ make-up) | |
| Range | 50–98% |
| Most preferred | 65–90% |
| Instantaneous SO$_2$:O$_2$ Molar Ratio in Combined Gas Stream to Sulfur Burner | |
| Range | 3:1–10:1 |
| Preferred | 4:1–7:1 |
| Most preferred | 5:1–6:1 |

The most economical operating pressure of the sulfur burner 16 is determined by the purity and supply pressure of the oxygen feed to the plant.

A first gas stream leaves the sulfur burner 16 and passes through one or more heat exchangers 18 used to generate steam before entering the sulfur trioxide absorber 20. The gas stream passes through the sulfur trioxide absorber 20 where essentially all of the sulfur trioxide is removed from the cooled sulfur burner effluent gas stream, and forms an essentially sulfur trioxide free sulfur dioxide rich gas feed to the recycle blower 26.

Particularly, the cooled sulfur trioxide containing gas stream enters the lower portion of the absorber 20 and flows countercurrent to sulfuric acid entering the top of the absorber 20 by spray nozzles coupled to line 32. In operation, the liquid sulfuric acid feed to the top of the sulfur trioxide absorber 20 is distributed evenly over a packed section, allowing intimate contact between gas and liquid to enhance mass transfer, and as the sulfuric acid and sulfur trioxide contact each other, the sulfur trioxide is absorbed to form more concentrated sulfuric acid. The same result may be achieved using a Venturi scrubber or other vapor-liquid contact devices (not shown). Hot concentrated sulfuric acid then passes through heat exchanger 28 to remove the heat of absorption/reaction of the sulfur trioxide and water. A portion of the formed sulfuric acid is withdrawn as product after it is combined and diluted with water entering the line 34, the balance is recycled back to the sulfur trioxide absorber 20. The required water for dilution in line 34 may be added to sulfur trioxide absorber 20 loop 32 at any place between the bottom and top of the sulfur trioxide absorber. In the heat exchanger 28, the heat of absorption/reaction released in the process is typically removed by the generation of low pressure steam, by water or air cooling. Alternatively, electrical or motive power can be generated by using heat exchanger 28 as the boiler in a Rankine-cycle using fluids such as sulfur dioxide. After passage of the gas stream through the sulfur trioxide absorber 20, the gas essentially depleted of the sulfur trioxide exits as a sulfur dioxide rich gas stream from the top of the sulfur trioxide absorber 20 from which it passes to recycle blower 26 where the gas is compressed to at least the operating pressure of sulfur burner 16.

The cooled sulfuric acid stream 36 contains a small amount of physically dissolved free sulfur dioxide (typically 0.25 to 9.0 weight %). This stream 36 is passed to sulfuric acid stripper 40 where the oxygen make-up feed to the process is preferably used as a stripping gas in the countercurrent stripper 40. The oxygen feed is introduced into the bottom of the sulfuric acid stripper 40 and then passes upward and exits the stripper 40 at the top and is fed by line 42 to the inlet of the recycler blower 26 or alternatively, directly to the sulfur burner 16. The essentially sulfur dioxide free sulfuric acid leaving the stripper 40 at the bottom thereof is cooled in a acid cooler 44 and then divided into two parts; one part is used to absorb sulfur dioxide from the system purge in purge gas absorber 46, the balance removed as sulfuric acid product. The cooled essentially sulfur dioxide free cooled sulfuric acid enters the top of the purge gas absorber 46, contacts the purge gas that moves upward in the absorber 46, and then is subsequently routed by line 48 to sulfur trioxide absorber 20. The sulfur dioxide free purge gas is removed from the process either by venting to the atmosphere or passing the purged gas to an argon recovery operation, or the like.

Table 1 illustrates the invention as applied to a typical oxygen based 1,200 metric ton per day sulfuric acid plant.

TABLE 1

| | |
|---|---|
| $H_2SO_4$ Product Rate: | 50304 Kg/hr. |
| $H_2SO_4$ Product Concentration: | 99.2% wt |
| | (20 ppmw $SO_2$) |
| Sulfur Feed Rate: | 16,293 Kg/hr. |
| Oxygen Feed Rate: | 24,771 Kg/hr. |
| Oxygen Feed Purity: | 99.0 vol. %, |
| | Argon 1.0 vol. % |
| | Nitrogen - Traces |
| Water Feed Rate: | 9571 Kg/hr |
| Sulfur Burner Operating Conditions: | 831° C., 3.75 $Kg/cm^2g$ |
| Combined Sulfur Dioxide Rich Gas: Stream plus Oxygen Make-up to Sulfur Burner Inlet, Instantaneous Compositions | $SO_2$ 73.45 vol. % |
| | $SO_3$ 0.03 vol. % |
| | $O_2$ 13.54 vol. % |
| | Argon 12.98 vol. % |
| | $CO_2$-traces |
| | Nitrogen-traces |
| Sulfur Burner Outlet Gas Composition: | $SO_2$ 76.59 vol. % |
| | $SO_3$ 8.58 vol. % |
| | $O_2$ 1.29 vol. % |
| | Argon 13.54 vol. % |
| | $CO_2$-traces |
| | Nitrogen traces |
| Purge Gas Composition to Atmosphere: | $SO_2$ 0.16 vol. % |
| | $O_2$ 9.08 vol. % |
| | Argon 90.76 vol. % |
| | $CO_2$-traces |
| | Nitrogen-traces |
| Purge Gas Rate to Atmosphere: | 334 Kg/hr. |
| Sulfur Dioxide Rate to Atmosphere: | 1.9 Kg/hr. (or 0.083 Kg/ton $H_2SO_4$) |
| Overall Sulfur Recovery (as sulfuric acid): | 99.994% |
| Overall Oxygen Utilizaton: | 99.9% |

It is apparent from the foregoing that the present invention provides a significant improvement over the processes heretofore known to produce sulfur trioxide and sulfuric acid. Employing a pressurized sulfur dioxide rich recycle gas loop, high-purity oxygen make-up feed and an instantaneous $SO_2$:$O_2$ molar ratio in the combined gas feed to the reaction zone substantially in excess of the stoichiometrically ratio will result in a significant improvement in reaction equilibrium, heat transfer, mass transfer, and reaction rates. These improvements enable the process to be operated simply and without catalytic converters but, nonetheless, with very high oxygen and sulfur utilization. The process requires lower power consumption and produces substantially less emission of sulfur oxides, sulfuric acid mist, and nitrogen oxides to the environment when compared to the known state-of-the art process. There is no theoretical minimum sulfur oxide and nitrogen oxide emission level of the process as is the case with single-pass-through air-based processes where equilibrium limits the sulfur dioxide conversion capability and nitrogen oxides are formed by reaction of nitrogen and oxygen. The process of the invention uses a closed system where emissions are determined by the amount of inert gases purged from the system that, in turn, is primarily determined by the purity of the oxygen feed to the process.

Unlike conventional sulfuric acid plants where power is required to force a large volume of air through a long process train with substantial pressure drop and where power can be saved only by making equipment and piping larger, the process of this invention requires less power to recycle the $SO_2$-rich gas through the system because of lower volume and reduction in pressure drop due to elimination of catalyst beds with connected heat exchangers. The process has only one sulfur trioxide absorption stage and requires substantially less heat transfer area because gas to gas heat exchangers are eliminated, higher heat transfer rates, and interactions between the various control loops are minimized.

It is apparent from the foregoing that various changes and modifications may be made without departing from the spirit of the invention. Accordingly, the scope of the invention should not be limited only by the appended claims.

What is claimed is:

1. A noncatalytic method of production of sulfuric acid from sulfur and oxygen comprising:
   a) combusting in a sulfur-combustion zone sulfur and a feed of oxygen-rich make-up gas stream containing at least 75% by volume oxygen and a feed of recycle sulfur dioxide gas stream comprising at least 50% by volume sulfur dioxide at a temperature of from about 700° to about 1000° C. and at a pressure up to about 35 $kg/cm^2$ gauge in which the instantaneous molar ratio of sulfur dioxide to oxygen in the combined gas feeds to the combustion zone, is at least 3:1 to form a first gas stream containing about 5% to about 15% by volume sulfur trioxide and at least 50% by volume sulfur dioxide, the balance of the gas comprising inert gases and nonreacted oxygen;
   b) passing said first gas stream and make-up water to a sulfur trioxide absorption zone to remove substantially all of the sulfur trioxide to form sulfuric acid and to produce a second gas stream comprising sulfur dioxide and substantially free of sulfur trioxide;
   c) compressing said second gas stream to at least the pressure of the sulfur-combustion zone to form the recycle sulfur dioxide rich gas stream;
   d) passing said recycle sulfur dioxide rich gas stream to the sulfur-combustion zone; and
   e) removing at least a portion of the formed sulfuric acid as product.

2. A process as claimed in claim 1 in which the instantaneous molar ratio of sulfur dioxide to oxygen provided to the sulfur combustion zone is from about 3:1 to about 10:1.

3. A process as claimed in claim 1 in which the instantaneous molar ratio of sulfur dioxide to oxygen provided to the sulfur-combustion zone is from about 4:1 to about 7:1.

4. A process as claimed in claim 1 in which the instantaneous molar ratio of sulfur dioxide to oxygen provided to the sulfur-combustion zone is from about 5.5:1.

5. A method according to claim 1 wherein the temperature of the sulfur-combustion zone effluent is from 750° C. to about 950° C.

6. A method according to claim wherein the temperature of the sulfur-combustion zone effluent is from about 775° C. to about 925° C.

7. A method according to claim 1 wherein the temperature in the sulfur-combustion zone effluent is between about 800° C. and about 900° C.

8. A process as claimed in claim 1 in which the sulfur-combustion zone is operated at a pressure of up to about 15 Kg/cm$^2$ gauge.

9. A method according to claim wherein the pressure in the sulfur-combustion zone is between about 1 and about 8 Kg/cm$^2$ gauge.

10. A method according to claim 1 wherein the pressure in the sulfur-combustion zone is between about 1.5 and about 5 Kg/cm$^2$ gauge 11. A method according to claim 1 wherein the oxygen-rich gas stream contains at least about 90 volume % oxygen.

12. A method according to claim 1 wherein the oxygen-rich gas stream contains at least about 95 volume % oxygen.

13. A method according to claim wherein the oxygen-rich gas stream contains at least about 99 volume % oxygen.

14. A method according to claim 1 wherein the second gas stream contains between about 50 and about 98 volume % sulfur dioxide.

15. A method according to claim 1 wherein the second gas stream contains between about 50 and about 98 volume % sulfur dioxide.

16. A method according to claim in which the recycle sulfur dioxide rich gas stream is combined with at least a portion of the oxygen rich gas make-up stream to form a gas stream containing at least about 45% by volume sulfur dioxide which is passed to the sulfur-combustion zone.

17. A method according to claim 1 in which a portion of the second gas stream is, after removal of sulfur trioxide and prior to compression, purged to remove inert gases from the process and the balance of the gas stream combined with at least a portion of the oxygen rich gas make-up stream to form a gas stream containing at least 45% by volume sulfur dioxide which is then compressed and passed to the sulfur combustion zone.

18. A noncatalytic method for the production of sulfuric acid from sulfur and oxygen which comprises:
 a) combusting in a sulfur combustion zone molten sulfur in the presence of an oxygen rich gas stream containing sulfur dioxide and a recycle sulfur dioxide containing gas stream at a temperature of from about 700° to about 1000° C. and a pressure of up to about 35 Kg/cm$^2$ gauge wherein the instantaneous SO$_2$:O$_2$ molar ratio as provided by the oxygen rich gas stream and recycle sulfur dioxide rich gas stream is about 3:1 to about 10:1 to form a first gas stream comprising essentially sulfur dioxide, sulfur trioxide and inerts, in which molar ratio of sulfur dioxide to sulfur trioxide is from about 5:1 to about 5:1, and in which the sulfur trioxide content is from about 5 to about 15 percent by volume.
 b) cooling the first gas stream;
 c) passing the cooled first gas stream in countercurrent flow to a flow of sulfuric acid in a first absorption zone where substantially all of the sulfur trioxide is removed from the first gas stream to form a substantially sulfur trioxide free second gas stream and sulfuric acid of higher strength;
 d) passing an oxygen rich gas make-up stream containing at least about 75% by volume oxygen through at least a portion of the sulfuric acid of higher strength to strip dissolved sulfur dioxide from the sulfuric acid of high strength to form stripped sulfuric acid and the oxygen rich gas stream containing stripped sulfur dioxide;
 e) withdrawing a portion of said stripped sulfuric acid as product;
 f) purging a portion of the second gas stream;
 g) passing the purged portion of the second gas stream through a absorption zone using the remainder of the stripped sulfuric acid to absorb oxides of sulfur from the purge gas;
 h) removing the essentially sulfur dioxide free purge gas from the process absorber;
 i) diluting a portion of the sulfuric acid of higher strength with water to form less concentrated sulfuric acid for contact with the first gas stream; and
 j) compressing in a compression zone the second gas stream and added oxygen rich gas stream containing sulfur dioxide to at least the pressure of the sulfur combustion zone and recycling the gas stream as recycle sulfur dioxide rich gas stream to the sulfur combustion zone.

19. A process as claimed in claim 18 in which the instantaneous molar ratio of sulfur dioxide to oxygen is from about 4:1 to 7:1.

20. A process as claimed in claim 18 in which the instantaneous molar ratio of sulfur dioxide to oxygen is from about 5.5:1.

21. A method according to claim 18 wherein the temperature of the sulfur-combustion zone effluent is from about 750° C. to about 950° C.

22. A method according to claim 18 wherein the temperature of the sulfur-combustion zone effluent is from about 775° C. to 925° C.

23. A method according to claim 18 wherein the temperature in the sulfur-combustion zone is between about 800° C. and about 900° C.

24. A process as claimed in claim 18 in which the sulfur-combustion zone is operated at a pressure of up to about 15 Kg/cm$^2$ gauge.

25. A method according to claim 18 wherein the pressure in the sulfur-combustion zone is between about 1 and about 8 Kg/cm$^2$ gauge.

26. A method according to claim 18 wherein the pressure in the sulfur-combustion zone is between about 1.5 and about 5 Kg/cm$^2$ gauge.

27. A method according to claim 18 wherein the oxygen-rich make-up gas contains at least about 95 volume % oxygen.

28. A method according to claim 18 wherein the oxygen-rich gas make-up contains at least about 95 volume % oxygen.

29. A method according to claim 18 wherein the oxygen-rich make-up gas contains at least about 99 volume % oxygen.

30. A method according to claim 18 wherein the second gas stream contains between about 50 and about 98 volume % sulfur dioxide.

31. A method according to claim 18 wherein the second gas stream contains between about 65 and about 90 volume % sulfur dioxide.

* * * * *

UNITED STATES PATENT AND TRADEMARK OFFICE
CERTIFICATE OF CORRECTION

PATENT NO. : 5,194,239

DATED : March 16, 1993

INVENTOR(S) : Jacobus J.H. Masseling; David Netzer

It is certified that error appears in the above-identified patent and that said Letters Patent is hereby corrected as shown below:

On title page, item

[56] References Cited, U.S. PATENT DOCUMENTS,
        change "3,907,979  9/1975  Jewning...423/522"
        to    -- 3,907,979  9/1975  Jennings...423/522 --.

Column 4, line 4, before "soon" change "a" to -- as --.
Column 4, line 15, before "reaction" change "an" to -- and --.
Column 4, line 17, change "DRAWING" to -- DRAWINGS --.
Column 4, line 19, after "FIG." insert -- 1 --.
Column 4, line 34, after "dioxide" delete the comma.

Column 6, line 34, after "as" insert -- a --.

In the Claims

Column 8, line 45, change "recycle" to -- recycled --.
Column 8, line 63, after "claim" insert -- 1 --.

Column 9, line 4, after "claim" insert -- 1 --.
Column 9, line 9, after "gauge" insert a period.
Column 9, line 16, after "claim" insert -- 1 --.
Column 9, line 23, change "about 50 and about 98" to -- about 65 and about 90 --.
Column 9, line 25, after "claim" insert -- 1 --.
Column 9, line 25, change "recycle" to -- recycled --.
Column 9, line 43, change "recycle" to -- recycled --.
Column 9, line 53, change "5:1" to -- 15:1 --.

UNITED STATES PATENT AND TRADEMARK OFFICE
CERTIFICATE OF CORRECTION

PATENT NO.   : 5,194,239
DATED        : March 16, 1993
INVENTOR(S)  : Jacobus J.H. Masseling; David Netzer It is certified that error appears in the above-identified patent and that said Letters Patent is hereby corrected as shown below:

Column 9, line 54, after "volume" change the period to a semicolon.

Column 10, line 10, before "absorption' change "a" to -- an --.

Column 10, line 22, change "recycle" to -- recycled --.

Signed and Sealed this

Twelfth Day of April, 1994

*Attest:*

BRUCE LEHMAN

*Attesting Officer*   Commissioner of Patents and Trademarks